(12) United States Patent
Raghavan et al.

(10) Patent No.: US 12,212,977 B2
(45) Date of Patent: Jan. 28, 2025

(54) SYSTEM AND METHOD FOR LIMITING THE NUMBER OF SYNCHRONIZATION SIGNAL BLOCKS (SSBS) IN ULTRA-WIDE BANDWIDTH BEAMFORMING SYSTEMS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Yu-Chin Ou, San Diego, CA (US); Kobi Ravid, Closter, NJ (US); Ozge Koymen, Princeton, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 17/402,651

(22) Filed: Aug. 16, 2021

(65) Prior Publication Data

US 2022/0070687 A1    Mar. 3, 2022

Related U.S. Application Data

(60) Provisional application No. 63/070,183, filed on Aug. 25, 2020.

(51) Int. Cl.
*H04W 16/28* (2009.01)
*H04W 56/00* (2009.01)

(52) U.S. Cl.
CPC ......... *H04W 16/28* (2013.01); *H04W 56/001* (2013.01)

(58) Field of Classification Search
CPC .. H04W 16/28; H04W 56/001; H04B 7/0617; H04B 7/0695
See application file for complete search history.

(56) References Cited

U.S. PATENT DOCUMENTS

| | | | |
|---|---|---|---|
| 2018/0278309 A1* | 9/2018 | Raghavan | H04B 7/0617 |
| 2019/0173537 A1 | 6/2019 | Cai et al. | |
| 2020/0007203 A1 | 1/2020 | Zhou et al. | |
| 2023/0064199 A1* | 3/2023 | Vieira | H04L 5/0023 |

FOREIGN PATENT DOCUMENTS

TW    I686060 B    2/2020

OTHER PUBLICATIONS

TW I686060 (B) machine translation of the description section obtained from espacenet (Year: 2020).*
International Search Report and Written Opinion—PCT/US2021/046214—ISA/EPO—Nov. 25, 2021, 13 pages.

* cited by examiner

*Primary Examiner* — Eric Myers
(74) *Attorney, Agent, or Firm* — Dinsmore & Shohl LLP—Qualcomm

(57) ABSTRACT

Methods and systems for operating a base station to reduce beam squinting include determining a lower bound on the number of directional beams used by the base station for millimeter wave wideband communications (e.g., based on operating conditions of the base station or wireless devices within the coverage area of the base station) and transmitting synchronization signal block (SSB) messages in an SSB Burst Set consistent with the determined lower bound on the number of directional beams used by the base station for millimeter wave wideband communications.

30 Claims, 12 Drawing Sheets

SYSTEM AND METHOD FOR LIMITING THE NUMBER OF SYNCHRONIZATION SIGNAL BLOCKS (SSBS) IN ULTRA-WIDE BANDWIDTH BEAMFORMING SYSTEMS

RELATED APPLICATIONS

This application claims the benefit of priority to U.S. Provisional Application No. 63/070,183, entitled "System and Method for Limiting the Number of Synchronization Signal Blocks (SSBs) In Ultra-Wide Bandwidth Beamforming Systems" filed Aug. 25, 2020, the entire contents of which are hereby incorporated by reference for all purposes.

BACKGROUND

Long Term Evolution (LTE), 5G new radio (NR), and other recently developed communication technologies allow wireless devices to communicate information at data rates (e.g., in terms of Gigabits per second, etc.) that are orders of magnitude greater than what was available just a few years ago. Today's communication networks are also more secure, resilient to multipath fading, allow for lower network traffic latencies, and provide better communication efficiencies (e.g., in terms of bits per second per unit of bandwidth used, etc.). These and other recent improvements in communication technologies have facilitated the emergence of the Internet of Things (IOT), large scale Machine to Machine (M2M) communication systems, autonomous vehicles, and other technologies that rely on consistent and secure wireless communications. As a result, billions of small, mobile, or resource constrained computing devices (e.g., smartphones, watches, smart appliances, autonomous vehicles, etc.) now use Internet protocol (IP) and cellular communication networks to communicate critical and mundane information.

LTE, 5G NR, and other modern communication networks utilize many broadcast signals to transmit communication control information from a cellular communication network to wireless devices. The broadcast signals may include synchronization information and radio resource configurations required for a wireless device to access the cellular network. The wireless device may receive and use these broadcast signals to register with the network through an Authentication and Key Agreement (AKA) procedure. After registration, the wireless device continues to monitor for the broadcast signals. For example, when the wireless device does not have a connection with a base station (e.g., due to its inactivity), the wireless device listens for paging messages broadcast on a shared channel. Even when the wireless device does have an active connection, the wireless device continues to listen for broadcast signals to determine potential changes in system-wide radio configurations and/or to identify the arrival of messages directed toward multiple wireless devices.

SUMMARY

The various aspects include methods of operating a base station to improve performance of directional beams, which may include determining a lower bound on the number of directional beams used by the base station for millimeter wave wideband communications based on operating conditions of the base station or wireless devices within the coverage area of the base station, and transmitting synchronization signal block (SSB) messages in an SSB Burst Set consistent with the determined lower bound on the number of directional beams used by the base station for millimeter wave wideband communications.

In some aspects, determining the lower bound on the number of directional beams used by the base station for millimeter wave wideband communications may include determining the lower bound on the number of directional beams used by the base station within millimeter frequency bands above a threshold (e.g., 24.25 GHz.). In some aspects, determining the lower bound on the number of directional beams used by the base station for millimeter wave wideband communications based on operating conditions of the base station or wireless devices within the coverage area of the base station may include determining the lower bound on the number of directional beams at a value that balances tradeoffs between improving communication link performance with wireless devices within the coverage area of the base station and operating conditions of the base station. In some aspects, determining the lower bound on the number of directional beams to a value that balances tradeoffs between improving communication link performance and improving operating efficiency of wireless devices within the coverage area of the base station may include determining a lower bound on the number of directional beams that improves one or more of antenna array gain or link margin with wireless devices within the coverage area of the base station.

In some aspects, determining the lower bound on the number of directional beams at a value that balances tradeoffs between improving communication link performance and improving operating efficiency of wireless devices within the coverage area of the base station may include setting the lower bound on the number of directional beams to a value that ensures base station equipment remains within operating temperature limits. In some aspects, determining the lower bound on the number of directional beams used by the base station for millimeter wave wideband communications based on operating conditions of the base station or wireless devices within the coverage area of the base station may include determining the lower bound on the number of directional beams based on a geographical size capturing the coverage area of the base station.

In some aspects, determining the lower bound on the number of directional beams used by the base station for millimeter wave wideband communications based on operating conditions of the base station or wireless devices within the coverage area of the base station may include determining the lower bound on the number of directional beams based on a number of wireless devices within the coverage area of the base station. In some aspects, determining the lower bound on the number of directional beams used by the base station for millimeter wave wideband communications based on operating conditions of the base station or wireless devices within the coverage area of the base station may include determining the lower bound on the number of directional beams based on angular coverage of the base station within the coverage area of the base station.

In some aspects, determining the lower bound on the number of directional beams used by the base station for millimeter wave wideband communications based on operating conditions of the base station or wireless devices within the coverage area of the base station may include determining the lower bound on the number of directional beams based on total bandwidth demand within the coverage area of the base station. In some aspects, determining the lower bound on the number of directional beams used by the base station for millimeter wave wideband communications based on operating conditions of the base station or wireless devices within the coverage area of the base station may include determining the lower bound on the number of directional beams based on a number of antenna elements in use by the base station. In some aspects, the number of antenna elements in use by the base station is determined by thermal conditions at the base station.

Further aspects include a base station having processor configured with processor-executable instructions to perform operations corresponding to any of the methods summarized above. Further aspects include a base station having means for performing functions corresponding to any of the methods summarized above. Further aspects include a non-transitory processor-readable storage medium having stored thereon processor-executable instructions configured to cause a processor of a base station to perform operations corresponding to any of the methods summarized above.

BRIEF DESCRIPTION OF THE DRAWINGS

The accompanying drawings, which are incorporated herein and constitute part of this specification, illustrate example embodiments of the invention, and, together with the general description given above and the detailed description given below, serve to explain features of the invention.

DETAILED DESCRIPTION

Figure 1:
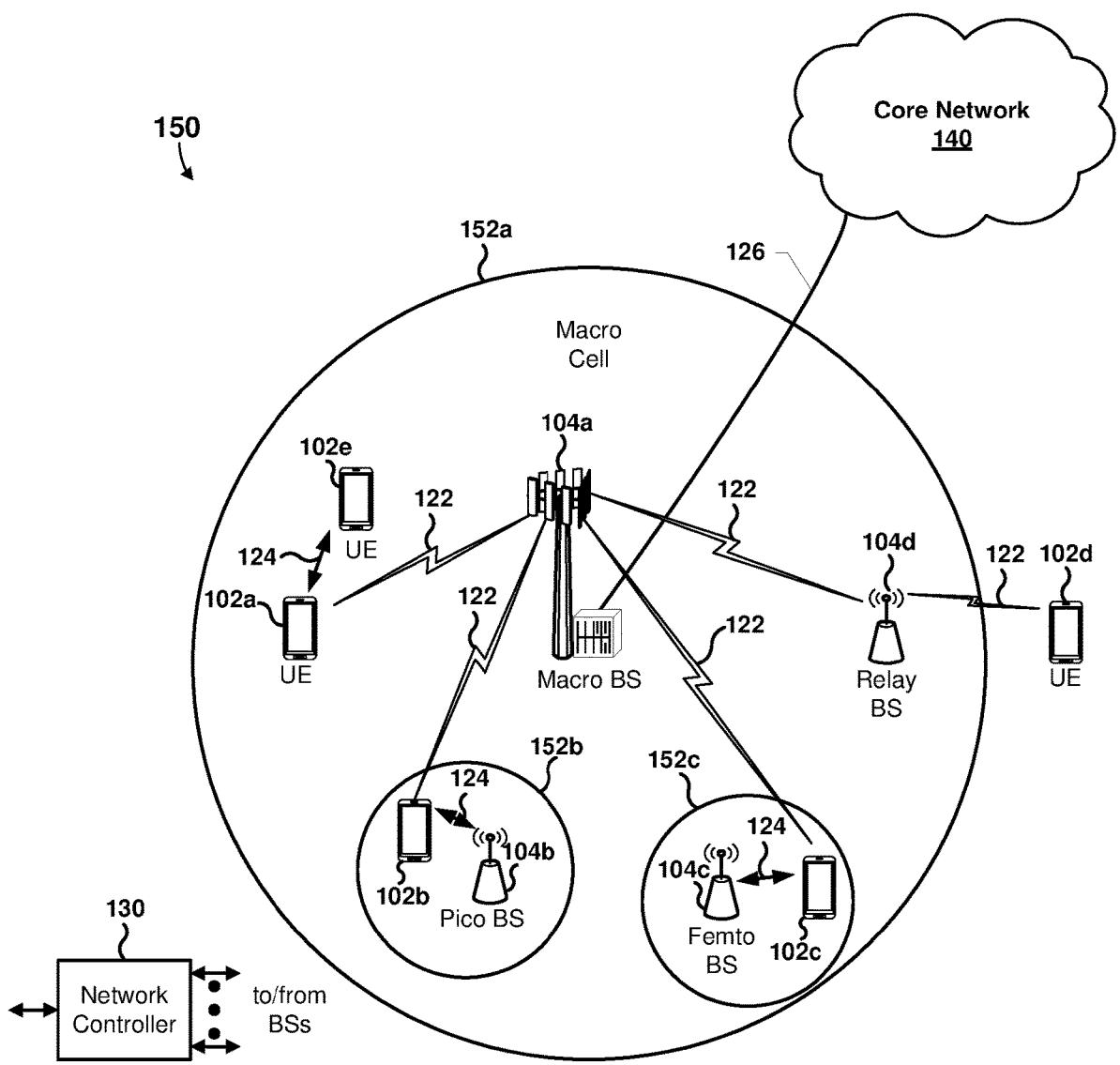
FIG. 1 is communication system block diagrams illustrating network components of example telecommunication systems suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and components (e.g., base stations, repeaters, Integrated Access and Backhaul (IAB) nodes, wireless devices, etc.) configured to implement the methods, for limiting the number of synchronization signal blocks (SSBs) used for initial acquisition. In some embodiments, a component may be configured to reduce or eliminate beam squinting over ultra-wideband communications within frequency range 4 (FR4) millimeter band by setting an upper bound and a lower bound for directional beams/beamforming. In some embodiments, the component may be configured to intelligently select the upper and/or lower bounds so as to balance tradeoffs between improved performance (such as improved antenna array gains, link margins, etc.) and improved power consumption, latency, and/or thermal dissipation characteristics of wireless devices within the coverage area of the base station. In some embodiments, the component may be configured to set the upper and/or lower bounds by limiting the maximum and/or minimum number of SSBs that are included within an SSB Burst Set. An SSB Burst Set may include all of the SSBs that are transmitted by a base station within a time window (such as within a 5 ms window of SSB transmissions, etc.).

A number of different cellular and mobile communication services and standards are available or contemplated in the future, all of which may implement and benefit from various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), and digital enhanced cordless telecommunications (DECT). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

5G NR networks separate frequency bands into different frequency ranges (FR). As used in this application, frequency range 1 (FR1) includes all sub 6 GHz frequency bands, frequency range 2 (FR2) includes frequency bands from 24.25 GHz to 52.6 GHz, and frequency range 4 (FR4) includes frequency bands from 52.6 GHz-114.25 GHz. The FR2 and FR4 bands may be referred to as millimeter bands. Radio waves in millimeter band may have wavelengths from 10 to 1 millimeter. Compared to FR1, the millimeter bands may have shorter range but much higher available bandwidth.

5G NR transmissions may include a synchronization signal block (SSB), system information (SI), reference signals (RS), a physical downlink control channel (PDCCH), a physical downlink shared channel (PDSCH), demodulation reference signals (DMRS), phase tracking reference signals (PTRSs), sounding reference signals (SRS), channel state information reference signals (CSI-RS) and other physical layer channels, signals, signal blocks, resource elements and/or information, all of which are provided to enable wireless devices to establish communication links with a base station transmitting such information. For example, a 5G NR base station may transmit an SSB in three or more orthogonal frequency division multiplexing (OFDM) symbols across 240 subcarriers and in pre-defined bursts across the time domain. When a wireless device is powered on or is moved into a new geographical area, the wireless device may perform cell search and selection operations that include detecting and decoding the SSB. The SSB may include information used by the wireless device to obtain system information and collect wireless signal measurements. For example, the first symbol in the SSB may be a primary synchronization signal (PSS), the second symbol may be a physical broadcast channel (PBCH), and the third symbol may be a secondary synchronization signal (SSS). The wireless device may receive and decode the PBCH to receive basic system configuration information in a master information block (MIB). The basic system configuration information may include system bandwidth information, the number of transmit antennas used by the base station, physical hybrid-ARQ indicator channel (PHICH) configuration information, a PHICH Ng value, a system frame number (SFN), and other similar information.

The term "ultra-wideband" is used herein to refer to a radio technology that that transmits or receives over a large portion of the radio spectrum with a bandwidth >500 MHz (as an illustrative example) allowing spectrum sharing across applications and use-cases. The millimeter band may be used for ultra-wideband communications.

The term "beamforming" is used herein to refer to antenna array design and signal processing techniques used for directional signal communications and/or to achieve spatial selectivity of radio frequency (RF) signal reception. Beamforming on the transmitter end of communications may be accomplished by selective delaying (known as "phase shifting") of signals coupled to different elements in an antenna array so that RF signals emitted by the antenna array at a particular angle (relative to the antenna array) are enhanced through constructive interference while RF signals emitted by the antenna array at other angles (relative to the antenna) exhibit lower signal strength due to destructive interference. Beamforming on the receiver end of communications may be accomplished by processing signals received by elements in an antenna array through phase shifting circuits so that RF signals received at particular angles relative to the receiving antenna array are enhanced through constructive interference while RF signals received at other angles relative to the wireless device are reduced in perceived signal strength through destructive interference. Using beamforming techniques, RF signals may be transmitted (e.g., by a base station or wireless device) in one or more directional "beams" within the millimeter band for ultra-wideband communications. Each of such directional beams may be controlled by the transmitter using beamforming techniques to sweep in one or two dimensions (i.e., azimuth and elevation directions). Beamforming in both transmitters and receivers may be accomplished using analog (e.g., phase shifter) circuits and digital processing techniques. To encompass both techniques, reference is sometimes made herein to "analog/RF beamforming" techniques and equipment.

The term "beam squinting" is used herein to refer to certain phenomena that could result in reduced beamforming performance, which may be referred to as antenna array gain loss. The word "squint" refers to a change in the beam direction (or the angle that a transmission is offset from the boresight direction of an antenna array, etc.) as a function of operating frequency, polarization, and/or antenna orientation. For example, a 5G NR network uses a small number of RF chains to support ultra-wide bandwidth communications, and as a result, a base station using a limited set of phase shifters for analog/RF beamforming within 5G NR networks can result in significant beamforming performance loss (e.g., reduced signal strength in signals aligned with the beam vs. signal emitted in all other directions) due to beam squinting.

The term "wireless device" may be used herein to refer to any one or all of internet-of-things (IOT) devices, cellular telephones, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, smart cars, connected vehicles, autonomous vehicles, and similar electronic devices which include a programmable processor, a memory and circuitry for sending and/or receiving wireless communication signals. While various embodiments are particularly useful in wireless devices, such as smartphones and tablets, the embodiments are generally useful in any electronic device that includes communication circuitry for accessing wireless Internet Protocol (IP) and data services through cellular and wireless communication networks.

The term "system on chip (SOC)" is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package (SIP)" may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

A wireless device may determine the number of beams transmitted by a base station based on the number of synchronization signal block (SSB) messages included within an SSB Burst Set of SSB messages transmitted by the base station. An SSB Burst Set may include all of the SSBs transmitted within a time window (such as within 5 ms window of SSB transmission, etc.). An SSB Burst Set may also include a parameter (referred to as "$L_{max}$") that defines the maximum number of SSBs that the base station includes in the SSB Burst Set. For example, the $L_{max}$ parameter may indicate that up to 64 SSBs are included in an SSB Burst Set, and thus that between 1 and 64 directional "beams" may be transmitted by the base station within the millimeter band for ultra-wideband communications.

While the number of SSBs in frequency range 2 (FR2), which is 24.25 GHz to 52.6 GHz, include an upper bound (e.g., 64 SSBs), technical standards and conventional solutions do not include a lower bound on the number of SSBs. As a result, a base station implementing conventional standards/solutions may employ a very small number of SSBs/beams (even just 1 SSB beam in the SSB Burst set). Employing a small number of SSBs/beams in transmissions of ultra-wideband communications may reduce power consumption, latency, and/or provide other advantages for the base station or a repeater, but may also reduce the array gains (such as due to beam broadening) and/or reduce link margins. In particular, using too few SSBs/beams may result in signals being transmitted in broad beams that are sensitive to phase and amplitude precision (such as due to calibration and quantization). Further, in frequency range 4 (FR4) with ultra-wide bandwidth operations, the performance of a broad beam codebook may be impacted if the base station uses too few directional beams of SSBs due to "beam squinting."

Various embodiments overcome the limitations of conventional standards and solutions by setting a lower bound on the number of directional beams used by the base station for millimeter ultra-wideband communications, and thus the number of SSBs transmitted by the base station for reception by wireless devices based on operating conditions of the base station or wireless devices within the coverage area of the base station. In some embodiments, a base station may be configured to reduce or eliminate beam squinting within frequency range 4 (FR4) millimeter band ultra-wideband communications by setting an upper bound and a lower bound on the number of beams used for directional beams/beamforming. In some embodiments, the base station may be configured to intelligently select the upper and/or lower bounds to balance tradeoffs between improved performance (such as improved array gains, link margins, etc.) and improved power consumption, latency, and/or thermal dissipation characteristics of wireless devices within the base station's coverage area. In some embodiments, the base station may be configured to set a lower bound or limit on the minimum number of SSBs that are included within an SSB Burst set. In some embodiments, the base station may determine the lower bound on the number of directional beams employed, and thus the minimum number of SSBs based on the spatial and bandwidth coverage that the base station is to support.

In various embodiments, base stations may adjust the lower bound on the number of directional beams used by the base station, and thus the number of SSBs transmitted by the base station for reception by wireless devices, in response to changing operating conditions of the base station or wireless devices within the base station coverage area. A processor of the base station may determine the lower bound on the number of directional beams using a variety of algorithms, including as non-limiting example techniques table lookup based on a measure parameter (e.g., number of camped wireless devices) using a database of appropriate lower bound numbers stored in memory, rule-based algorithms, parametrized calculational algorithms, or a trained neural network. For example, the total bandwidth that must be supported by a base station will vary with the number of wireless devices active in a coverage area, which may vary with time of day and day of week due to business, school, commuting and leisure activities of wireless device users. Thus, a processor of a base station may determine the lower bound on the number of directional beams, and thus the minimum number of SSBs, dynamically as the demand for bandwidth and number of wireless devices increases and decreases throughout the day, over the course of a week, and over the course of a year. Additionally, the coverage area supported by a base station may change in extent and in particular directions depending on the time of day and day of week as repeaters, CPEs, IAB nodes, and similar temporary base stations are activated (e.g., stadia, special events, etc.). For example, a base station supporting a cell that encompasses office buildings, factories, shopping malls, or similar facilities that include local repeaters, CPE or IAB networks may determine one lower bound on the number of directional beams during evening and weekend hours, and another lower bound on the number of directional beams during working hours when the base station's coverage area is reduced when repeaters, CPEs and IAB nodes are activated to provide wireless coverage in local cells. In addition to changing the base station's coverage area, activation of local base stations (e.g., repeaters, CPEs, IAB nodes, etc.) may change the angular coverage area of a base station, such as reducing the need to generate beams in certain directions. A further condition that the base station may consider in determining the number of directional beams used by the base station, and thus the number of SSBs transmitted by the base station, are related to equipment conditions, such as thermal conditions in the base station equipment, equipment or chip-level failures, etc. For example, repeated use of antenna elements over multiple slots at millimeter wave carrier frequencies leads to increased power consumption that is dissipated as heat in the transmitting device. Thus, a base station may need to limit the number of antenna elements used for generating beams to avoid exceeding thermal limits, which may affect the number of directional beams used by the base station in transmitting RF signals, and thus the number of SSBs transmitted by the base station.

FIG. 1 illustrates an example of a communications system 150 that is suitable for implementing various implementations. The communications system 150 may be a 5G NR network, or any other suitable network such as an LTE network.

The communications system 150 may include a heterogeneous network architecture that includes a communication network 140 and a variety of wireless devices (illustrated as wireless device 102a-102e in FIG. 1). The communications system 150 also may include a number of base stations (illustrated as the BS 104a, the BS 104b, the BS 104c, and the BS 104d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. For ease of reference, the term "base station" is used herein to refer to any of a range of communication nodes in wireless communication networks including for example an eNB, NR BS, gNB, TRP, AP, node B, 5G NB, Customer Premises Equipment (CPE), an integrated access backhaul (IAB) node and other communication nodes that establish a wireless communication "cell."

A base station 104a-104d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 104a may be a macro BS for a macro cell 152a, a base station 104b may be a pico BS for a pico cell 152b, and a base station 104c may be a femto BS for a femto cell 152c. A base station 104a-104d may support one or multiple (for example, three) cells.

In some examples, a cell may not be stationary, and the geographic area of the cell may move according to the location of a mobile base station. In some examples, the base stations 104a-104d may be interconnected to one another as well as to one or more other base stations or network nodes (not illustrated) in the communications system 150 through various types of backhaul interfaces, such as a direct physical connection, a virtual network, or a combination thereof using any suitable transport network.

The communications system 150 also may include relay stations (such as relay BS 104d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 104d may communicate with the macro base station 104a and the wireless device 102d in order to facilitate communication between the macro base station 104a and the wireless device 102d. A relay station also may be referred to as a relay base station, a relay, etc.

The communications system 150 may be a heterogeneous network that includes base stations of different types, for example, macro base stations, pico base stations, femto base stations, relay base stations, etc. These different types of base stations may have different transmit power levels, different coverage areas, and different impacts on interference in communications system 150. For example, macro base stations may have a high transmit power level (for example, 5 to 40 Watts), whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 102a, 102b, 102c may be dispersed throughout communications system 150, and each wireless device may be stationary or mobile. A wireless device also may be referred to as an access terminal, a terminal, a mobile station, a subscriber unit, a station, etc. A wireless device 102a, 102b, 102c may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

A macro base station 104a may communicate with the communication network 140 over a wired or wireless communication link 126. The wireless devices 102a, 102b, 102c may communicate with a base station 104a-104d over wireless communication links 122.

Wired communication links 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Wireless communication links 122, 124 may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 150 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may depend on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to two streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 102 may be included inside a housing that houses components of the wireless device 102, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

In some implementations, two or more wireless devices 102a-e (for example, illustrated as the wireless device 102a and the wireless device 102e) may communicate directly using one or more sidelink channels 124 (for example, without using a base station 104a-d as an intermediary to communicate with one another). For example, the wireless devices 102a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 102a-e may perform scheduling operations, resource selection operations, as well as other operations described elsewhere herein as being performed by the base station 104a-d.

To establish communication with a base station 104a-104d, a wireless device 102a-102e may attempt to acquire SI from the base station 104a-104d. SI may be provided in one or more system information blocks, such a Master Information Block (MIB) and one or more System Information Blocks (SIBs). SI provides timing and structure information that enables the wireless device 102a-102e to receive and decode further information from the base station 104a-104d that enables the wireless device 102a-102e for example, to access communications through the base station 104a-104d, cell access, to perform cell reselection, intra-frequency, inter-frequency and inter-RAT cell selection procedures, and other operations.

In 5G NR, certain system information, such as the MIB and a SIB1 message, are broadcast by a base station. In some implementations, additional SI may be broadcast as well. However, in some implementations, the additional SI (such as on-demand SI) may be transmitted by the base station in response to a request for the additional SI (such as a request for the on-demand SI). In some implementations, the broadcast SI (that is, the MIB or SIB1 messages) may include scheduling information to enable the wireless device 102a-102e to request and receive the on-demand system information.

When a wireless device 102a-102e is powered on, the wireless device 102a-e may perform a cell search and acquire one or more synchronization signals (such as a Primary Synchronization Signal (PSS) and a Secondary Synchronization Signal (SSS)) and a Physical Broadcast Channel (PBCH) from a base station 104a-104d. Using the synchronization signal(s) and information from the PBCH the wireless device 102a-102e may receive, decode and store MIB message(s) from the base station 104a-104d. Using parameters from the decoded MIB, the wireless device 102a-102e may receive and decode the SIB1 message. In some implementations, the SIB1 message may indicate that the base station 104a-d is configured to provide one or more on-demand SI messages. To acquire the on-demand SI messages, the wireless device 102a-102e may send a request to the base station 104a-104d for the one or more on-demand SI messages. In some implementations, sending the request for the one or more on-demand messages may be part of a Random Access Channel (RACH) request procedure.

Figure 2:
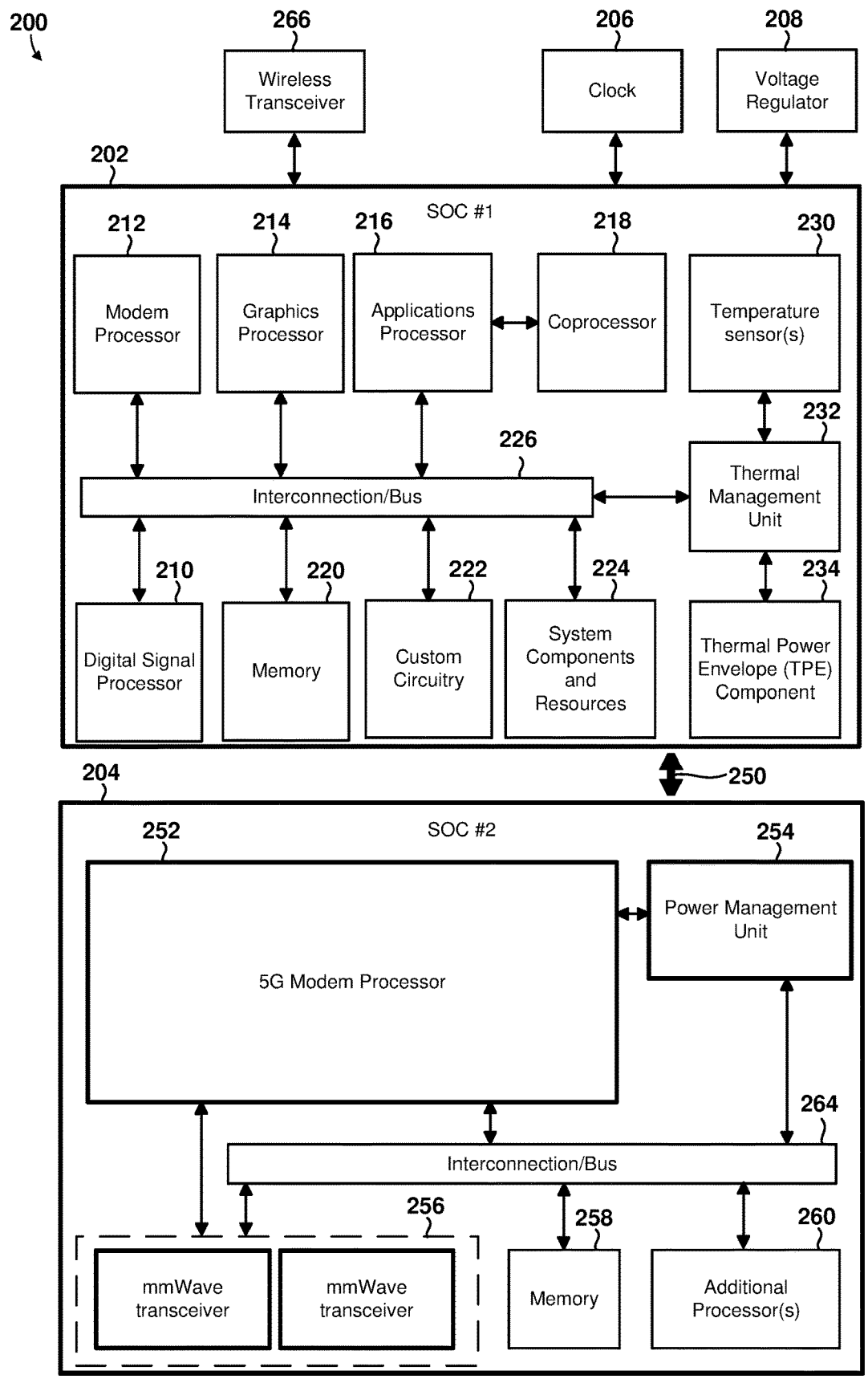
FIG. 2 is a component block diagram of an example computing system that could be configured to detect and respond to unauthorized emergency messages and unauthorized presidential alerts in accordance with the embodiments.

FIG. 2 illustrates an example computing system or SIP 200 architecture that may be used in wireless devices implementing the various implementations.

With reference to FIGS. 1 and 2, the illustrated example SIP 200 includes two SOCs 202, 204, a clock 206, a voltage regulator 208, and a wireless transceiver 266 configured to send and receive wireless communications via an antenna (not shown) to/from wireless devices, such as a base station 104a. In some implementations, the first SOC 202 operates as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE)

component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via an interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
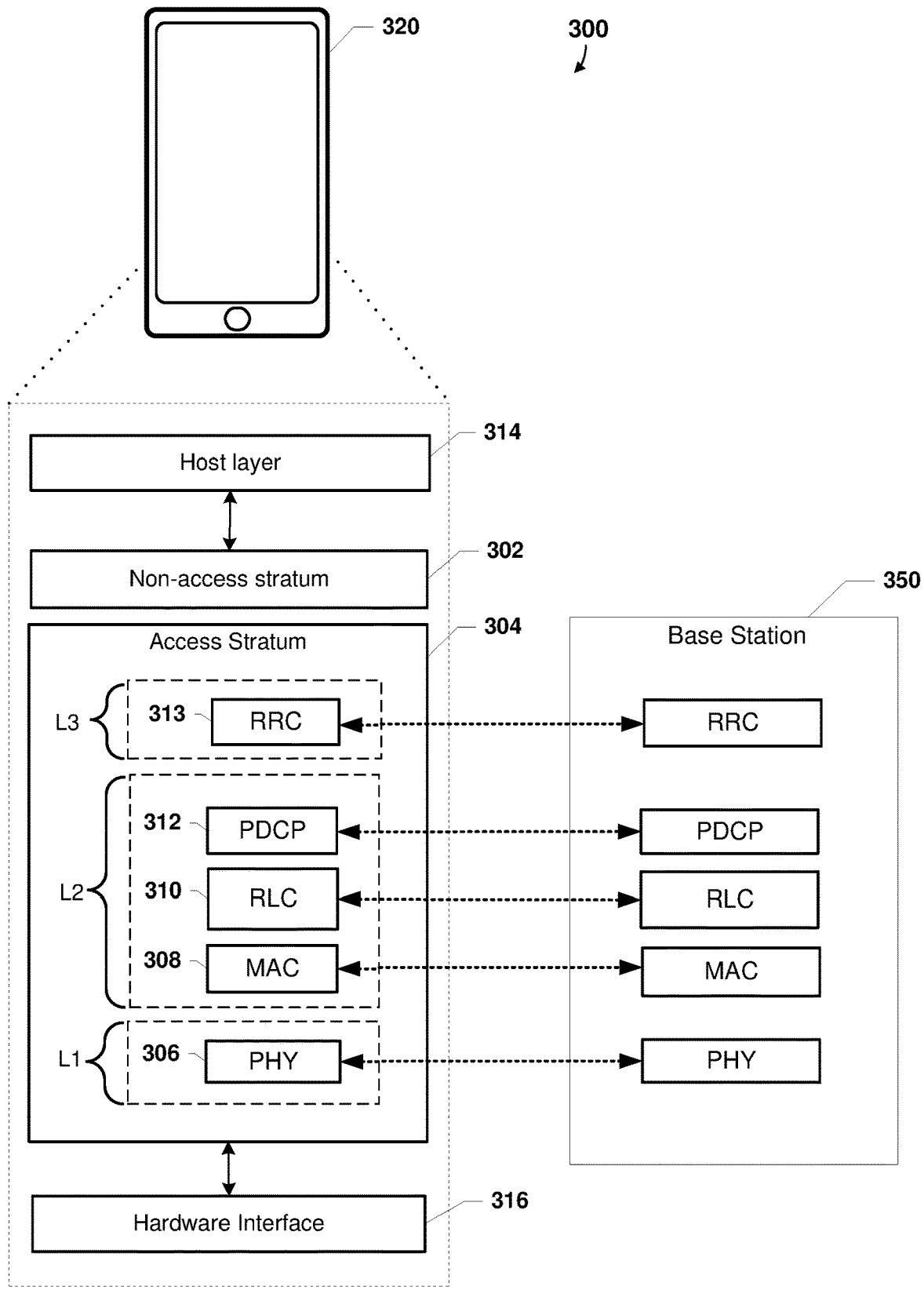
FIG. 3 is a component block diagram of an example software architecture including a radio protocol stack for the user and control planes in wireless communications.

FIG. 3 illustrates an example of a software architecture 300 including a radio protocol stack for the user and control planes in wireless communications between a base station 350 (such as the base station 104a) and a wireless device 320 (such as the wireless devices 102a-e, 200). With reference to FIGS. 1A-3, the wireless device 320 may implement the software architecture 300 to communicate with the base station 350 of a communication system (such as 100). In various implementations, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various implementations, the RRC sublayer 313 may provide functions including broadcasting system information, paging, and establishing and releasing an RRC signaling connection between the wireless device 320 and the base station 350.

In various implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layers (such as transport, session, presentation, application, etc.) that provide host layer functions. For example, in some implementations, the software architecture 300 may include a network layer (such as IP layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency transceivers).

Figure 4:
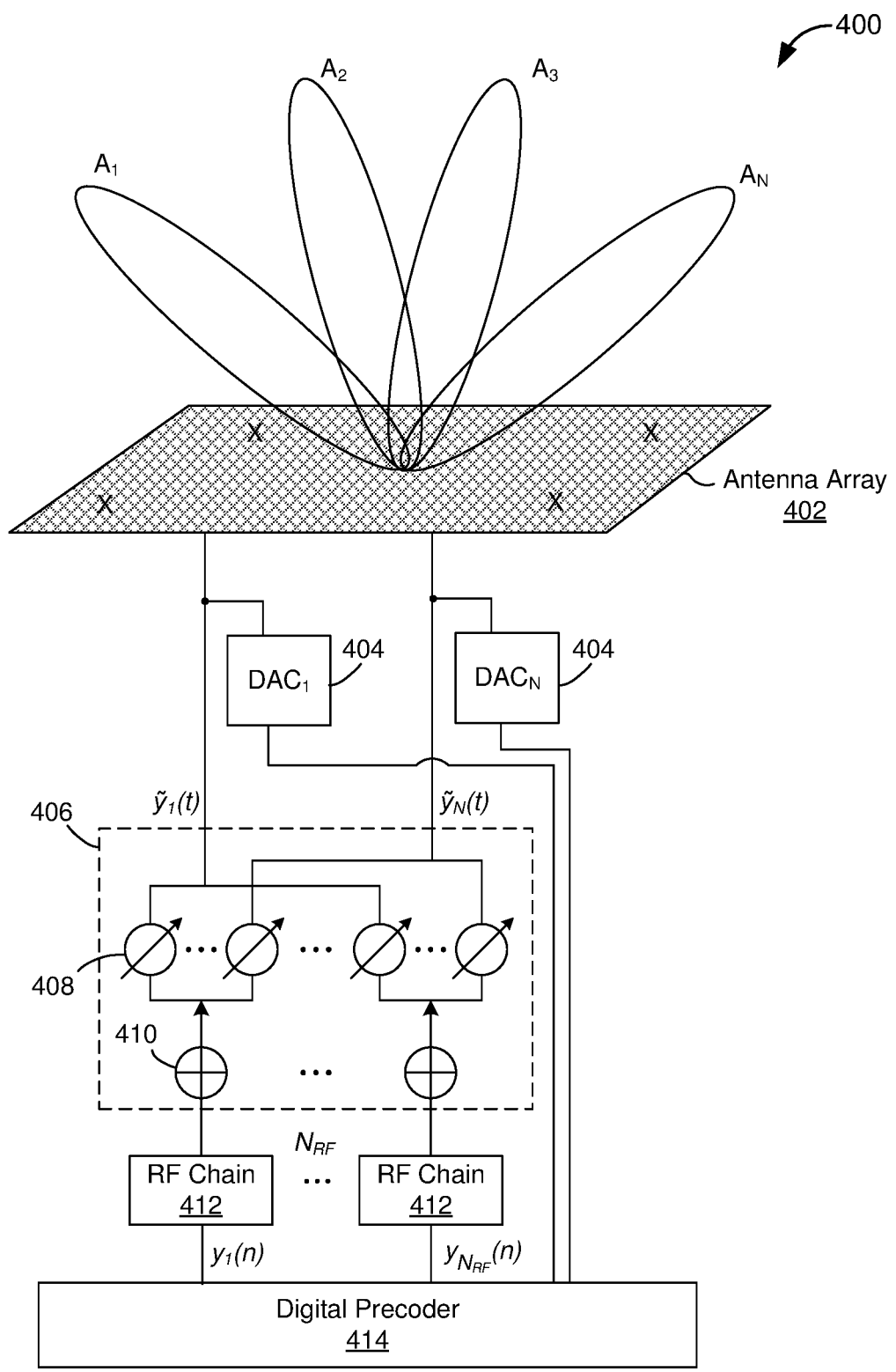
FIG. 4 is a component block diagram illustrating a mmWave transmitter suitable for use with various embodiments.

FIG. 4 is a component block diagram providing a notional illustration of a mmWave transmitter 400 implementing analog and digital beamforming architectures suitable for use with various embodiments. With reference to FIGS. 1-4, in various embodiments, a base station (e.g., 110a-110d, 200, 350) may use the mmWave transmitter 400 to perform beamforming to transmit RF signals with enhanced signal strength in particular directions or beams.

In various embodiments, a base station may be configured with either or both analog beamforming circuitry or digital beamforming functionality, and may use either or both capabilities. Implementing both analog and digital beamforming architectures on a base station may address limitations presented by a single static architecture. One architecture may be efficient (e.g., use an appropriate spectral efficiency, resolution, and/or power consumption and/or the like) for a first set of communications and another architecture may be efficient for a second set of communications.

Referring to FIG. 4, a mmWave transmitter 400 may include an antenna array 402 made up of a plurality of antenna elements included within one or more antenna panels. In FIG. 4, the value "N" represents the number of antenna elements in the antenna array 402.

In digital beamforming functionality, the transmitter 400 may transmit $\tilde{y}_N(t)$ signals from antenna elements of the antenna array 402 from analog signals provided to the antenna elements by digital-to-analog converters (DACs) 404 (e.g., $DAC_1$ to $DAC_N$). The DACs 404 receive digital signal information (e.g., frequency domain information) from a digital precoder 414 and convert the received digital signals into analog signals (e.g., time domain signals) that are applied to respective antenna elements. The digital precoder 414 may perform digital phase shifting on signals provided to the DACs 404 so that the analog signal provided to the antenna elements results in RF radiation from the antenna array 402 that constructively interferes to form beams $A_1$ to $A_N$ of RF radiation.

The mmWave transmitter 400 may include analog beamforming circuitry such as a hybrid beamforming circuit 406 that may receive n signals from N RF chains 412 that receive signals for transmission from the digital precoder 414 or other signal generator. Hybrid beamforming may be performed in radio frequencies or at an intermediate frequency through the hybrid beamforming circuit 406. The hybrid beamforming circuit 406 may include a bank of summers 410 and a bank of phase shifters 408 that work together to adjust the phase of analog signals $\tilde{y}_N(t)$ that are applied to each element N in the antenna array 402. By selectively controlling the phase of RF signals emitted by each antenna element N the antenna array 402 can be configured to emit one or more RF beams $A_1$ to $A_N$.

Figure 5A:
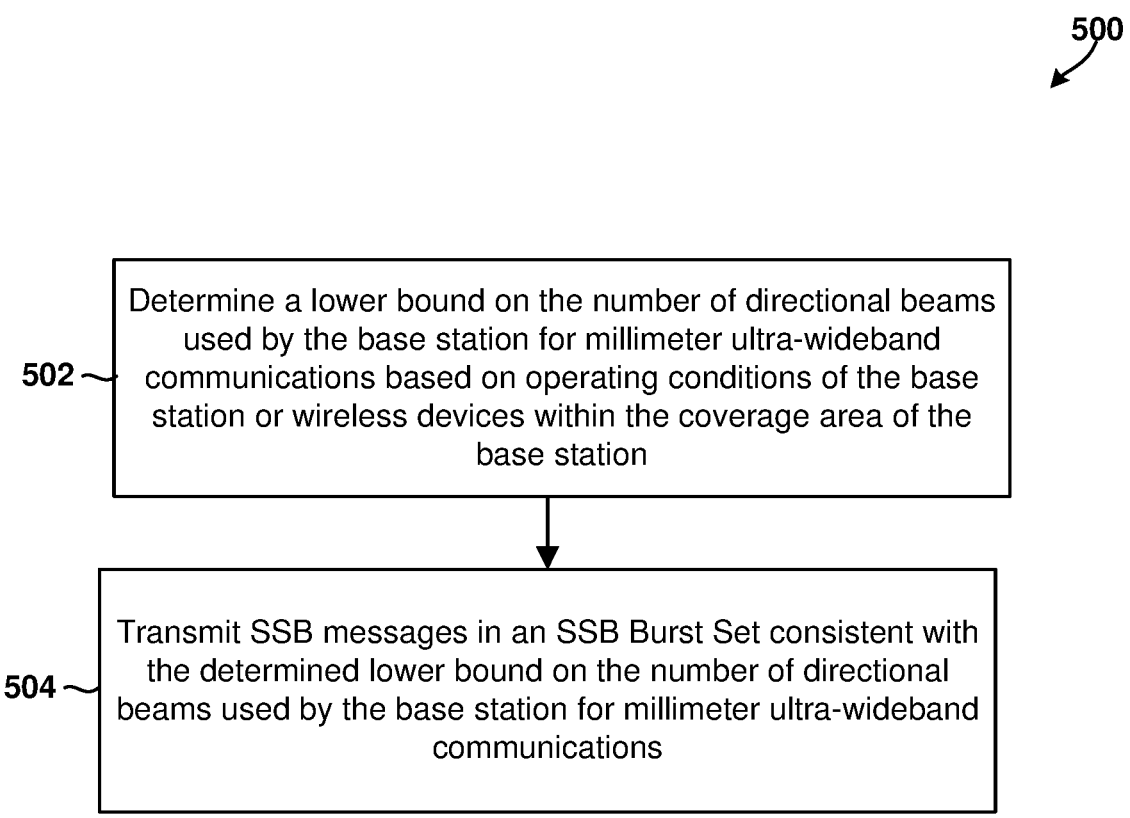
FIG. 5A-5G are process flow diagrams illustrating methods of operating a base station to eliminate or reduce beam squinting in accordance with some embodiments.

FIG. 5A illustrates a method 500 that may be executed by a processor of user equipment and/or one or more other computing devices of operating a base station to determine a lower bound on the number of directional beams used for FR4 millimeter band ultra-wideband communications in accordance with some embodiments. FIGS. 5B, 5C, 5D, 5E, 5F, and 5G illustrate alternative operations in methods 510, 520, 530, 540, 550, and 560 that may be performed as part of the method 500 in some embodiments. The operations of the methods 500, 510, 520, 530, 540, 550, and 560 are intended to be illustrative. In some embodiments, methods 500, 510, 520, 530, 540, 550, and 560 may be accomplished with one or more additional operations not described, and/or without one or more of the operations discussed.

With reference to FIGS. 1-5G, the methods 500, 510, 520, 530, 540, 550, and 560 may be implemented in one or more processors (e.g., 202, 204, 210, 212, 214, 216, 218, 252, 260) of a base station processing system configured with processor-executable instructions stored on a non-transitory processor-readable storage medium. The processing system may include one or more processor (e.g., 202, 204, 210, 212, 214, 216, 218, 252, 260) configured through hardware, firmware, and/or software stored in memory (e.g., 220, 258, 325).

FIG. 5A illustrates a method 500 of operating a base station to determine and use a minimum number of directional beams in accordance with some embodiments.

In block 502, a base station processor may determine a lower bound on the number of directional beams used by the base station for millimeter ultra-wideband communications based on operating conditions of the base station or wireless devices within the coverage area of the base station. In particular, the base station may determine the lower bound on the number of directional beams used by the base station within millimeter frequency bands in frequency range 4 (FR4) from 52.6 GHz-114.25 GHz. The base station may determine a lower bound on the number of directional beams that balances tradeoffs between improved performance (such as improved array gains, link margins, latency, etc.) and improved power consumption and/or thermal dissipation characteristics within the base station. In determining operating conditions of wireless devices within the coverage area of the base station, the base station may rely on recommendations of the wireless devices and/or relays, CPE, IAB nodes, etc. within the coverage area. For example, the base station may determine the lower bound value to account for power/thermal consumption issues, cell size (ISD), repeater configurations, coverage area of the base station, bandwidth covered, hardware settings (phase shifter precision and calibration accuracy, amplitude control in terms of precision and calibration error), sensitivity, etc. In various embodiments, the processor may use a variety of algorithms or methods to make the determination in block 502 based on one or more of such measurable parameters or conditions. As a non-limiting example, a processor of the base station may use a parameter (e.g., temperature of some components, cell size, etc.) to look up a lower bound value in a data table. Such a data table may be stored in memory at the time of manufacture (e.g., based on equipment capabilities), during installation in a base station (e.g., based on base station equipment, measurements of beam characteristics by a mobile network measuring system, cell characteristics, etc.), and/or uploaded over a network after installation (e.g., by a network manager based on changing characteristics of the cell). As another non-limiting example, the base station may use machine learning techniques based on feedback received from network sensors and/or connected wireless devices when the base station is configure to employ different numbers of beams. As a further non-limiting example, the base station may apply a trained neural network to fixed and measurable parameters, in which the neural network is trained by a supplier or the network based on measured beam characteristics. Means for performing the operations of block 520 may include a processor (e.g., 202, 204, 210, 212, 214, 216, 218, 252, 260) coupled to memory (e.g., 220, 258, 325).

In block 504, the base station processor may transmit SSB messages in each SSB Burst set (such as in each 5 ms SSB transmission window, etc.) consistent with the determined lower bound on the number of directional beams used by the base station for millimeter ultra-wideband communications. Means for performing the operations of block 504 may include a processor (e.g., 202, 204, 210, 212, 214, 216, 218, 252, 260) coupled to a wireless transmitter of the base station.

The operations of the method 500 may be repeated periodically or semi-persistently in response to changes in operational conditions in the base station or the coverage area.

Figure 5B:
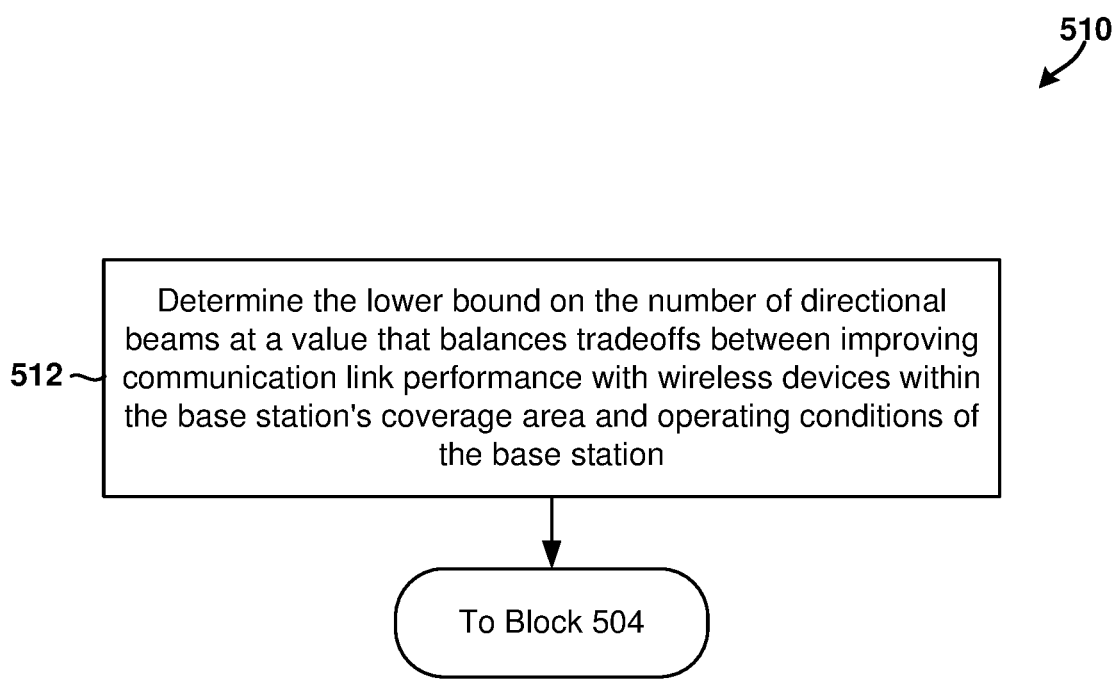

FIG. 5B illustrates a method 510 in which the processor may determine the lower bound on the number of directional beams in a manner that balances tradeoffs between improved performance (such as improved array gains, link margins, latency, etc.) and improved power consumption and/or thermal dissipation characteristics within the base station. In block 512, the processor may determine the lower bound on the number of directional beams as a value that balances tradeoffs between improving communication link performance with wireless devices within the base station's coverage area and operating conditions of the base station. In some embodiments, the processor may determine a lower bound on the number of directional beams that improves one or more of antenna array gain or link margin with wireless devices within the base station's coverage area. In some embodiments, the processor may determine a lower bound on the number of directional beams at a value that balances tradeoffs between improving communication link performance and improving operating efficiency of wireless devices within the base station's coverage area by setting the lower bound on the number of directional beams to a value that ensures base station equipment remains within operating temperature limits. As a non-limiting example, a processor of the base station may use a measurable parameter or parameters (e.g., communication link quality as reported by wireless devices, equipment temperature, etc.) to look up a lower bound value in a data table that correlates the measurable parameter(s) to suitable lower bound values for directional beams. Such a data table may be preloaded in memory (e.g., during manufacture or installation) and/or updated via over-network updates. Means for performing the operations of block 520 may include a processor (e.g., 202, 204, 210, 212, 214, 216, 218, 252, 260) coupled to memory (e.g., 220, 258, 325).

Following the operations in block 512, the processor may the base station processor may transmit SSB messages in each SSB Burst set consistent with the determined lower bound on the number of directional beams in block 504 of the method 500 as described.

Figure 5C:
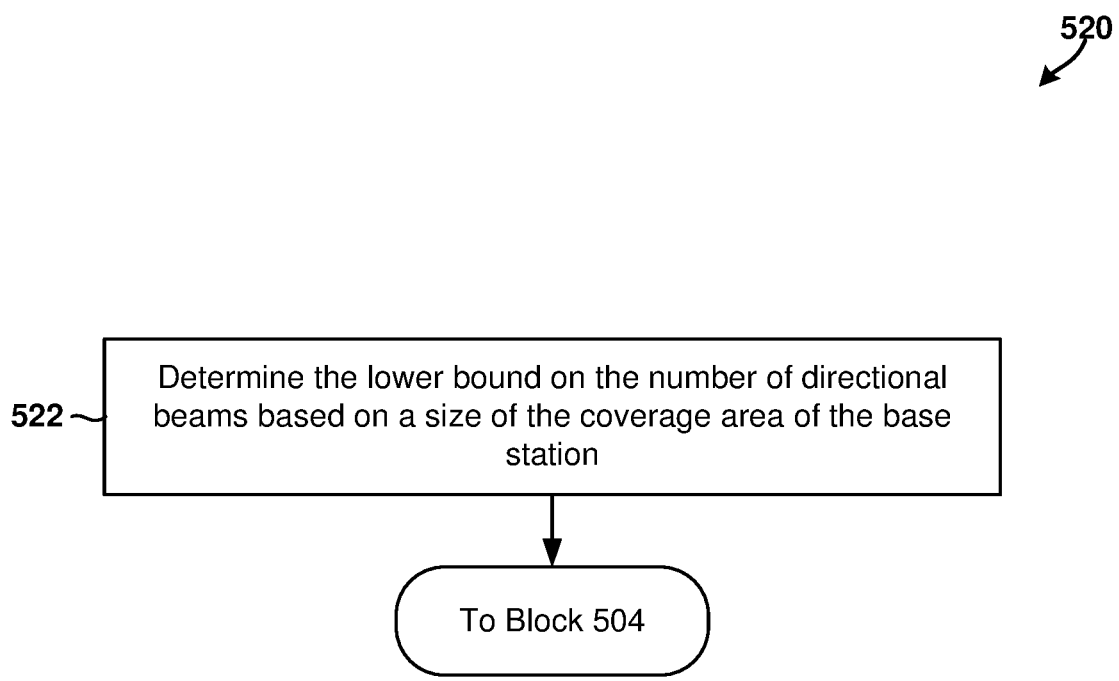

FIG. 5C illustrates a method 520 in which the processor may determine the lower bound on the number of directional beams based on the size or extent of the cell supported by the base station. In some embodiments, the processor may determine the lower bound based on the number of directional beams based on a size of the coverage area of the base station in block 522. In some embodiments, the processor may determine the lower bound based on the number of directional beams based on the dimensions or extent of the cell supported of the base station in block 522. As a non-limiting example, a processor of the base station may use the size of the coverage area to look up a lower bound value in a data table that correlates the size of the coverage area to suitable lower bound values for directional beams. Such a data table may be preloaded in memory (e.g., during manufacture or installation) and/or updated via over-network updates. Means for performing the operations of block 522 may include a processor (e.g., 202, 204, 210, 212, 214, 216, 218, 252, 260) coupled to memory (e.g., 220, 258, 325).

Following the operations in block 522, the processor may the base station processor may transmit SSB messages in each SSB Burst set consistent with the determined lower bound on the number of directional beams in block 504 of the method 500 as described.

Figure 5D:
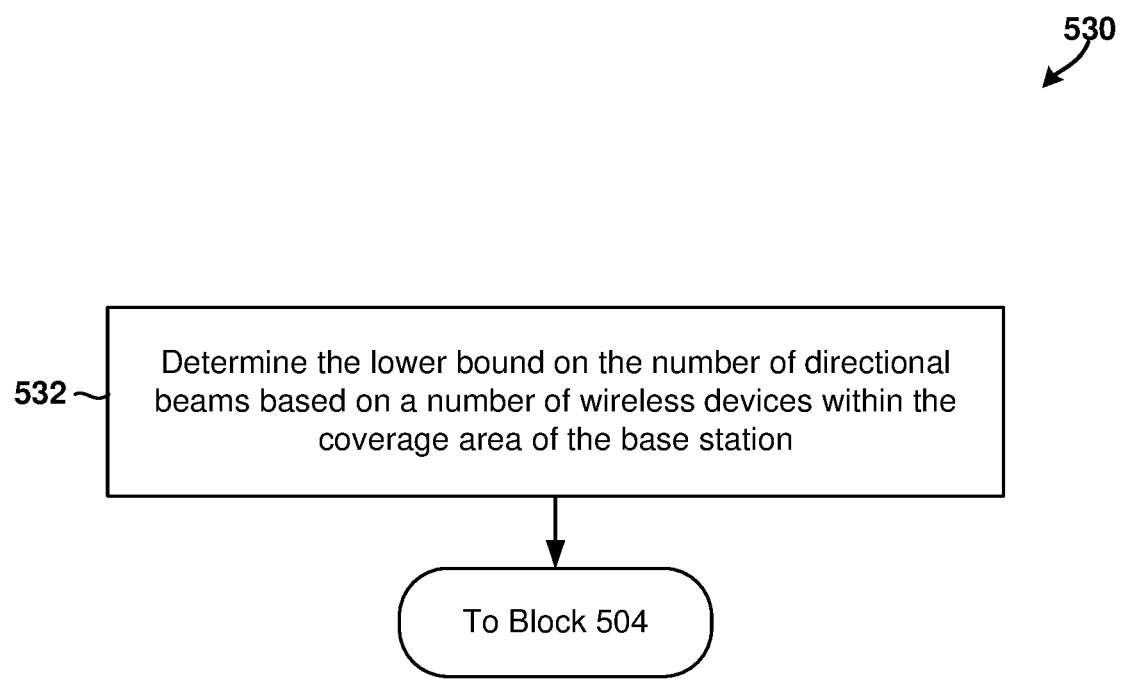

FIG. 5D illustrates a method 530 in which the processor may determine the lower bound on the number of directional beams based on a number of wireless devices and/or the bandwidth demanded by the wireless devices within the coverage area of the base station. In block 532, the processor may determine the number of wireless devices camped on the base station and determine the lower bound on the number of directional beams based on the determined number of wireless devices within the coverage area of the base station. In some embodiments, the determination may be based primarily upon the number of wireless devices camped on the base station. In some embodiments, the determination may be based primarily on the total bandwidth demanded by the wireless devices camped on the base station. As a non-limiting example, a processor of the base station may use the number of wireless devices within the coverage area and/or total bandwidth demanded by the wireless devices camped on the base station to look up a lower bound value in a data table that correlates the number of wireless devices and/or bandwidth demands to suitable lower bound values for directional beams. Such a data table may be preloaded in memory (e.g., during manufacture or installation) and/or updated via over-network updates. Means for performing the operations of block 532 may include a processor (e.g., 202, 204, 210, 212, 214, 216, 218, 252, 260) coupled to memory (e.g., 220, 258, 325).

Following the operations in block 532, the processor may the base station processor may transmit SSB messages in each SSB Burst set consistent with the determined lower bound on the number of directional beams in block 504 of the method 500 as described.

Figure 5E:
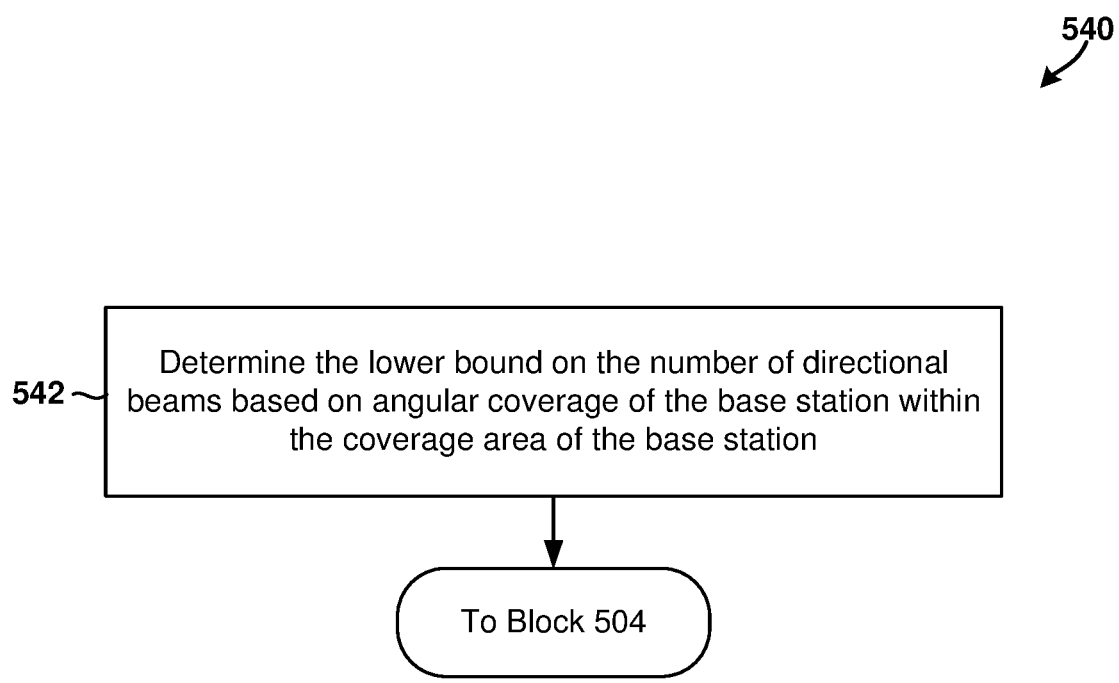

FIG. 5E illustrates a method 540 in which the processor may determine the lower bound on the number of directional beams based on the number and characteristics of angular coverage characteristics of the cell. In block 542, the processor may determine the lower bound on the number of directional beams based on angular coverage of the base station within the coverage area of the base station. The smaller the angular coverage that the base station must cover, the lower the number of directional beams and SSBs required to provide the coverage without resulting in performance reductions, such as due to beam squinting. As a non-limiting example, a processor of the base station may use the angular coverage of the base station to look up a lower bound value in a data table that correlates the angular coverage of the base station to suitable lower bound values for directional beams. Such a data table may be preloaded in memory (e.g., during manufacture or installation) and/or updated via over-network updates. Means for performing the operations of block 542 may include a processor (e.g., 202, 204, 210, 212, 214, 216, 218, 252, 260) coupled to memory (e.g., 220, 258, 325).

Following the operations in block 542, the processor may the base station processor may transmit SSB messages in each SSB Burst set consistent with the determined lower bound on the number of directional beams in block 504 of the method 500 as described.

Figure 5F:
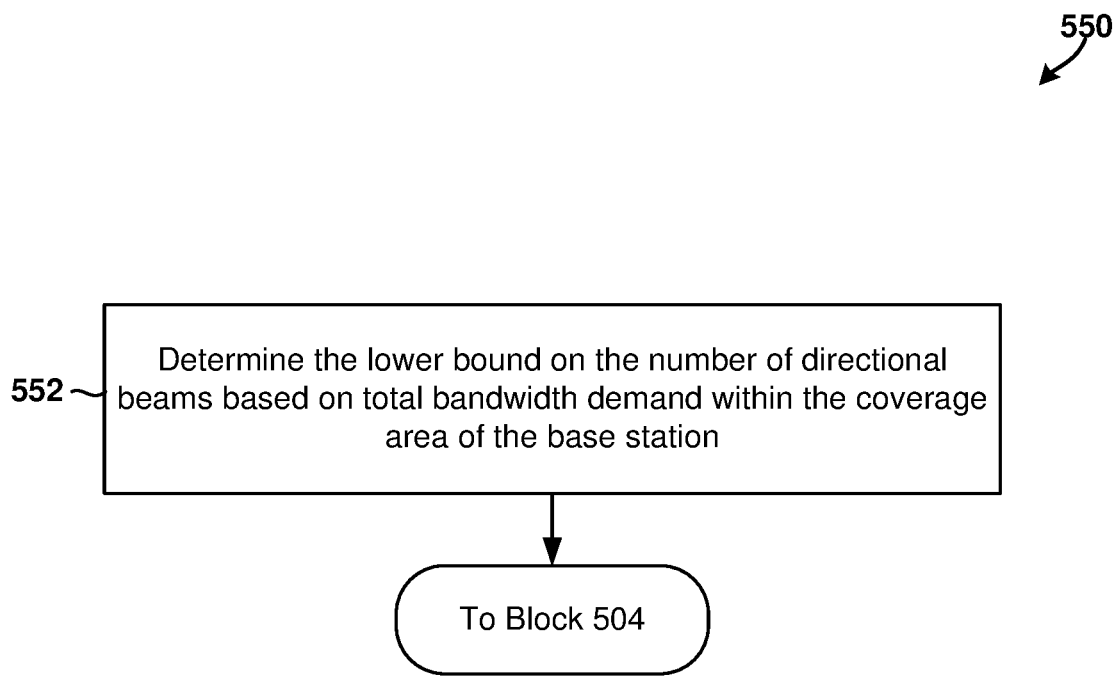

FIG. 5F illustrates a method 550 in which the processor may determine the lower bound on the number of directional beams based on the bandwidth demanded by the wireless devices within the coverage area of the base station. In block 552, the processor may determine the lower bound on the number of directional beams based on the total bandwidth demanded by the wireless devices camped on the base station. As a non-limiting example, a processor of the base station may use the total bandwidth demanded by the wireless devices camped on the base station to look up a lower bound value in a data table that correlates the total bandwidth demanded by the wireless devices camped on the base station to suitable lower bound values for directional beams. Such a data table may be preloaded in memory (e.g., during manufacture or installation) and/or updated via over-network updates. Means for performing the operations of block 552 may include a processor (e.g., 202, 204, 210, 212, 214, 216, 218, 252, 260) coupled to memory (e.g., 220, 258, 325).

Following the operations in block 552, the processor may the base station processor may transmit SSB messages in each SSB Burst set consistent with the determined lower bound on the number of directional beams in block 504 of the method 500 as described.

Figure 5G:
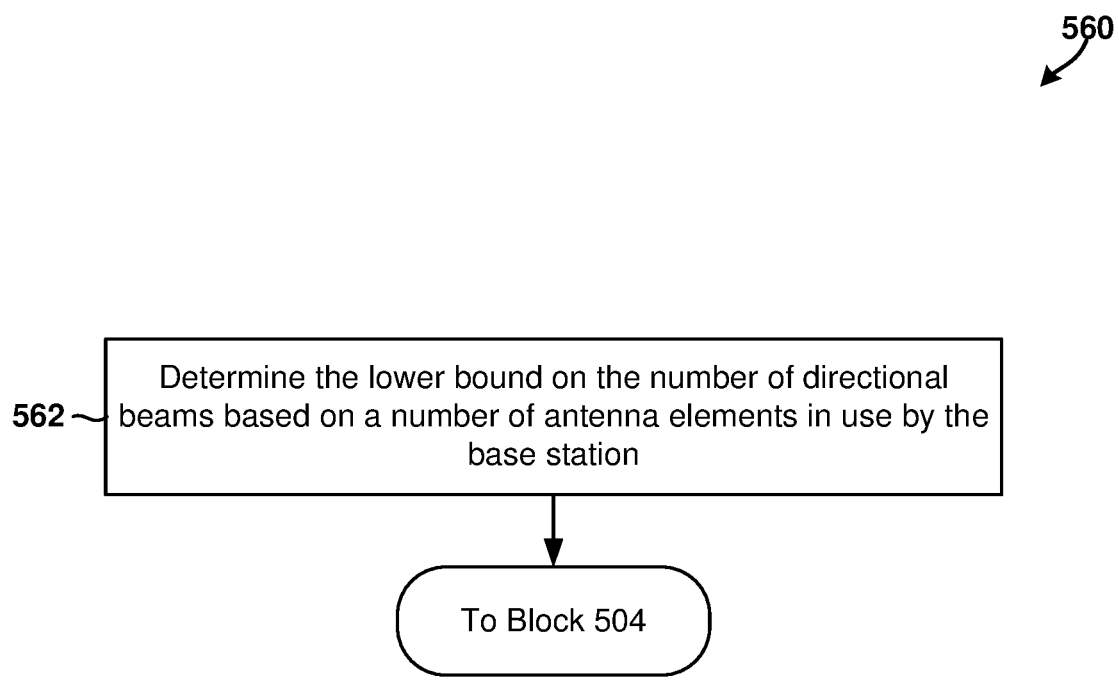

FIG. 5G illustrates a method 560 in which the processor may determine the lower bound on the number of directional beams based on current operating conditions of the base station antenna system. In block 562, the processor may determine the lower bound on the number of directional beams based on a number of antenna elements in use by the base station. As an example, the base station may need to reduce the number of antenna elements that are activated and used to generate beams in order to maintain base station components within thermal operating limits. This may be the case in hot weather conditions as each antenna element generates heat when radiating. Thus, the number of antenna elements in use by a base station, and so the determined lower bound on the number of directional beams, may vary with weather, season and time of day. As another example, antenna elements may fail from time to time, reducing the number of antenna elements available for generating directional beams until repairs are made. Thus, the base station may change the lower bound on the number of directional beams from time to time in response to equipment failures. As a non-limiting example, a processor of the base station may use the current operating conditions of the base station antenna system to look up a lower bound value in a data table that correlates operating conditions of the base station antenna system to suitable lower bound values for directional beams. Such a data table may be preloaded in memory (e.g., during manufacture or installation) and/or updated via over-network updates. Means for performing the operations of block 562 may include a processor (e.g., 202, 204, 210, 212, 214, 216, 218, 252, 260) coupled to memory (e.g., 220, 258, 325).

Following the operations in block 562, the processor may the base station processor may transmit SSB messages in each SSB Burst set consistent with the determined lower bound on the number of directional beams in block 504 of the method 500 as described.

Figure 6:
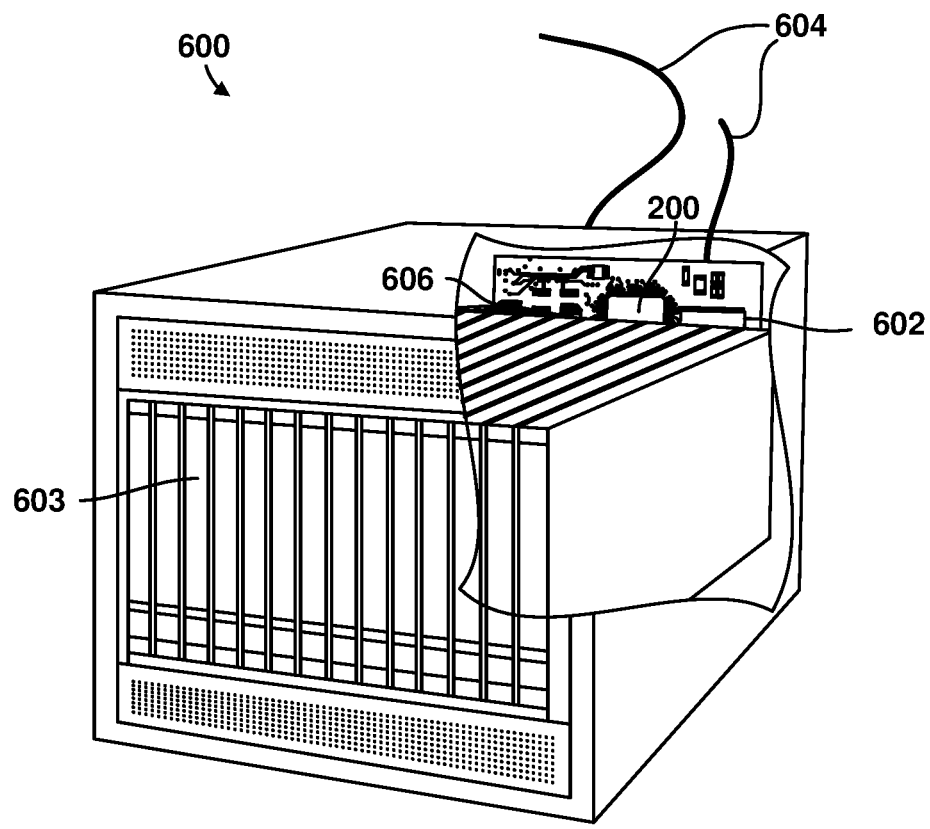
FIG. 6 is a component block diagram of an example server computing device suitable for implementing various embodiments.

FIG. 6 shows a component block diagram of an example network computing device 600 for use in a base station, suitable for use in various implementations. Such network computing devices may include at least the components illustrated in FIG. 5. With reference to FIG. 1-5G, the network computing device 600 may typically include a processing system 200, such as described with reference to FIG. 2, coupled to volatile memory 602 and a large capacity nonvolatile memory, such as a disk drive 603. The network computing device 600 also may include a peripheral memory access device such as a floppy disc drive, compact disc (CD) or digital video disc (DVD) drive 606 coupled to the processor system 200. The network computing device 600 also may include network access ports 604 (or interfaces) coupled to the processing system 200 for establishing data connections with a wireless transceiver (e.g., 266) and a network, such as the Internet or a local area network coupled to other system computers and servers. The network computing device 600 may include additional access ports, such as USB, Firewire, Thunderbolt, and the like for coupling to peripherals, external memory, or other devices.

The processors of a network computing device 600 may be any programmable microprocessor, microcomputer or multiple processor chip or chips that can be configured by software instructions (applications) to perform a variety of functions, including the functions of the various implementations described above. Typically, software applications may be stored in the memory 603 before they are accessed and loaded into the processor. The processors may include internal memory sufficient to store the application software instructions.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods 500, 510, 520, 530, 540, 550, and 560 may be substituted for or combined with one or more operations of the methods 500, 510, 520, 530, 540, 550, and 560.

Implementation examples are described in the following paragraphs. While some of the following implementation examples are described in terms of example methods, further example implementations may include: the example methods discussed in the following paragraphs implemented by a base station including a processor configured to perform operations of the example methods; the example methods discussed in the following paragraphs implemented by a base station including means for performing functions of the example methods; and the example methods discussed in the following paragraphs implemented as a non-transitory processor-readable storage medium having stored thereon processor-executable instructions configured to cause a processor of a base station to perform the operations of the example methods.

Example 1. A method of operating a base station to reduce beam squinting, including: determining a lower bound on a number of directional beams used by the base station for millimeter wave wideband communications based on operating conditions of the base station or wireless devices within a coverage area of the base station; and transmitting synchronization signal block (SSB) messages in an SSB Burst Set consistent with the determined lower bound on the number of directional beams used by the base station for millimeter wave wideband communications.

Example 2. The method of example 1, in which determining the lower bound on the number of directional beams used by the base station for millimeter wave wideband communications includes determining the lower bound on the number of directional beams used by the base station within millimeter frequency bands above a threshold.

Example 3. The method of either example 1 or example 2, in which determining the lower bound on the number of directional beams used by the base station for millimeter wave wideband communications based on operating conditions of the base station or wireless devices within the coverage area of the base station includes determining the lower bound on the number of directional beams at a value that balances tradeoffs between improving communication link performance with wireless devices within the coverage area of the base station and operating conditions of the base station.

Example 4. The method of example 3, in which determining the lower bound on the number of directional beams to a value that balances tradeoffs between improving communication link performance and improving operating efficiency of wireless devices within the coverage area of the base station includes determining a lower bound on the number of directional beams that improves one or more of antenna array gain or link margin with wireless devices within the coverage area of the base station.

Example 5. The method of example 3, in which determining the lower bound on the number of directional beams at a value that balances tradeoffs between improving communication link performance and improving operating efficiency of wireless devices within the coverage area of the base station includes setting the lower bound on the number of directional beams to a value that ensures base station equipment remains within operating temperature limits.

Example 6. The method of any of examples 1-5, in which determining the lower bound on the number of directional beams used by the base station for millimeter wave wideband communications based on operating conditions of the base station or wireless devices within the coverage area of the base station includes determining the lower bound on the number of directional beams based on a geographical size capturing the coverage area of the base station.

Example 7. The method of any of examples 1-6, in which determining the lower bound on the number of directional beams used by the base station for millimeter wave wideband communications based on operating conditions of the base station or wireless devices within the coverage area of the base station includes determining the lower bound on the number of directional beams based on a number of wireless devices within the coverage area of the base station.

Example 8. The method of any of examples 1-7, in which determining the lower bound on the number of directional beams used by the base station for millimeter wave wideband communications based on operating conditions of the base station or wireless devices within the coverage area of the base station includes determining the lower bound on the number of directional beams based on angular coverage of the base station within the coverage area of the base station.

Example 9. The method of any of examples 1-8, in which determining the lower bound on the number of directional beams used by the base station for millimeter wave wideband communications based on operating conditions of the base station or wireless devices within the coverage area of the base station includes determining the lower bound on the number of directional beams based on total bandwidth demand within the coverage area of the base station.

Example 10. The method of any of examples 1-9, in which determining the lower bound on the number of directional beams used by the base station for millimeter wave wideband communications based on operating conditions of the base station or wireless devices within the coverage area of the base station includes determining the lower bound on the number of directional beams based on a number of antenna elements in use by the base station.

Example 11. The method of example 10, in which the number of antenna elements in use by the base station is determined by thermal conditions at the base station.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The functions described for various embodiments may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method of operating a base station to reduce beam squinting, comprising:
    determining a minimum number of directional beams from the base station for millimeter wave wideband communications based on a measure parameter associated with operating conditions of the base station or wireless devices within a coverage area of the base station; and
    transmitting synchronization signal block (SSB) messages in an SSB Burst Set consistent with the determined minimum number of directional beams from the base station for millimeter wave wideband communications.

2. The method of claim 1, wherein determining the minimum number of directional beams from the base station for millimeter wave wideband communications comprises determining the minimum number of directional beams from the base station within millimeter frequency bands above a threshold.

3. The method of claim 1, wherein determining the minimum number of directional beams from the base station for millimeter wave wideband communications based on the operating conditions of the base station or wireless devices within the coverage area of the base station comprises determining the minimum number of directional beams at a value that balances tradeoffs between improving communication link performance with wireless devices within the coverage area of the base station and operating conditions of the base station.

4. The method of claim 3, wherein determining the minimum number of directional beams to a value that balances tradeoffs between improving communication link performance and improving operating efficiency of wireless devices within the coverage area of the base station comprises determining the minimum number of directional beams that improves one or more of antenna array gain or link margin with wireless devices within the coverage area of the base station.

5. The method of claim 3, wherein determining the minimum number of directional beams at a value that balances tradeoffs between improving communication link performance and improving operating efficiency of wireless devices within the coverage area of the base station comprises setting the minimum number of directional beams to a value that ensures base station equipment remains within operating temperature limits.

6. The method of claim 1, wherein determining the minimum number of directional beams from the base station for millimeter wave wideband communications based on the operating conditions of the base station or wireless devices within the coverage area of the base station comprises determining the minimum number of directional beams based on a geographical size capturing the coverage area of the base station.

7. The method of claim 1, wherein determining the minimum number of directional beams from the base station for millimeter wave wideband communications based on the operating conditions of the base station or wireless devices within the coverage area of the base station comprises determining the minimum number of directional beams based on a number of wireless devices within the coverage area of the base station.

8. The method of claim 1, wherein determining the minimum number of directional beams from the base station for millimeter wave wideband communications based on the operating conditions of the base station or wireless devices within the coverage area of the base station comprises determining the minimum number of directional beams based on angular coverage of the base station within the coverage area of the base station.

9. The method of claim 1, wherein determining the minimum number of directional beams from the base station for millimeter wave wideband communications based on the operating conditions of the base station or wireless devices within the coverage area of the base station comprises determining the minimum number of directional beams based on total bandwidth demand within the coverage area of the base station.

10. The method of claim 1, wherein determining the minimum number of directional beams from the base station for millimeter wave wideband communications based on the operating conditions of the base station or wireless devices within the coverage area of the base station comprises determining the minimum number of directional beams based on a number of antenna elements in use by the base station.

11. The method of claim 10, wherein the number of antenna elements in use by the base station is determined by thermal conditions at the base station.

12. A base station, comprising:
a processor configured with processor-executable instructions to:
determine a minimum number of directional beams from the base station for millimeter wave wideband communications based on a measure parameter associated with operating conditions of the base station or wireless devices within a coverage area of the base station; and
transmit synchronization signal block (SSB) messages in an SSB Burst Set consistent with the determined minimum number of directional beams from the base station for millimeter wave wideband communications.

13. The base station of claim 12, wherein the processor is configured to determine the minimum number of directional beams from the base station for millimeter wave wideband communications by determining the minimum number of directional beams from the base station within millimeter frequency bands above a threshold.

14. The base station of claim 12, wherein the processor is configured to determine the minimum number of directional beams from the base station for millimeter wave wideband communications based on the operating conditions of the base station or wireless devices within the coverage area of the base station by determining the minimum number of directional beams at a value that balances tradeoffs between improving communication link performance with wireless devices within the coverage area of the base station and operating conditions of the base station.

15. The base station of claim 14, wherein the processor is configured to determine the minimum number of directional beams to a value that balances tradeoffs between improving communication link performance and improving operating efficiency of wireless devices within the coverage area of the base station by determining the minimum number of directional beams that improves one or more of antenna array gain or link margin with wireless devices within the coverage area of the base station.

16. The base station of claim 14, wherein the processor is configured to determine the minimum number of directional beams to a value that balances tradeoffs between improving communication link performance and improving operating efficiency of wireless devices within the coverage area of the base station by setting the minimum number of directional beams to a value that ensures base station equipment remains within operating temperature limits.

17. The base station of claim 12, wherein the processor is configured to determine the minimum number of directional beams from the base station for millimeter wave wideband communications based on the operating conditions of the base station or wireless devices within the coverage area of the base station by one or more of:
determining the minimum number of directional beams based on a geographical size capturing the coverage area of the base station;
determining the minimum number of directional beams based on a number of wireless devices within the coverage area of the base station;
determining the minimum number of directional beams based on angular coverage of the base station within the coverage area of the base station; or
determining the minimum number of directional beams based on total bandwidth demand within the coverage area of the base station.

18. The base station of claim 12, wherein the processor is configured to determine the minimum number of directional beams from the base station for millimeter wave wideband communications based on the operating conditions of the base station or wireless devices within the coverage area of the base station by determining the minimum number of directional beams based on a number of antenna elements in use by the base station.

19. A base station, comprising:
means for determining a minimum number of directional beams from the base station for millimeter wave wideband communications based on a measure parameter associated with operating conditions of the base station or wireless devices within a coverage area of the base station; and
means for transmitting synchronization signal block (SSB) messages in an SSB Burst Set consistent with the determined minimum number of directional beams from the base station for millimeter wave wideband communications.

20. The base station of claim 19, wherein means for determining the minimum number of directional beams from the base station for millimeter wave wideband communications comprises means for determining the minimum number of directional beams from the base station within millimeter frequency bands above a threshold.

21. The base station of claim 19, wherein means for determining the minimum number of directional beams from the base station for millimeter wave wideband communications based on the operating conditions of the base station or wireless devices within the coverage area of the base station comprises means for determining the minimum number of directional beams at a value that balances tradeoffs between improving communication link performance with wireless devices within the coverage area of the base station and operating conditions of the base station.

22. The base station of claim 21, wherein means for determining the minimum number of directional beams to a value that balances tradeoffs between improving communication link performance and improving operating efficiency of wireless devices within the coverage area of the base station comprises one or more of:
means for determining a lower bound on the number of directional beams that improves one or more of antenna array gain or link margin with wireless devices within the coverage area of the base station; or
means for setting the minimum number of directional beams to a value that ensures base station equipment remains within operating temperature limits.

23. The base station of claim 19, wherein means for determining the minimum number of directional beams from the base station for millimeter wave wideband communications based on the operating conditions of the base station or wireless devices within the coverage area of the base station comprises one or more of:
means for determining the minimum number of directional beams based on a geographical size capturing the coverage area of the base station;

means for determining the minimum number of directional beams based on a number of wireless devices within the coverage area of the base station;

means for determining the minimum number of directional beams based on angular coverage of the base station within the coverage area of the base station; or means for determining the minimum number of directional beams based on total bandwidth demand within the coverage area of the base station.

24. The base station of claim 19, wherein means for determining the minimum number of directional beams from the base station for millimeter wave wideband communications based on the operating conditions of the base station or wireless devices within the coverage area of the base station comprises means for determining the minimum number of directional beams based on a number of antenna elements in use by the base station.

25. A non-transitory computer readable storage medium having stored thereon processor-executable software instructions configured to cause a processor in a base station to perform operations comprising:

determining a minimum number of directional beams from the base station for millimeter wave wideband communications based on a measure parameter associated with operating conditions of the base station or wireless devices within a coverage area of the base station; and transmitting synchronization signal block (SSB) messages in an SSB Burst Set consistent with the determined minimum number of directional beams from the base station for millimeter wave wideband communications.

26. The non-transitory computer readable storage medium of claim 25, wherein the stored processor-executable software instructions are configured to cause the processor to perform operations such that determining the minimum number of directional beams from the base station for millimeter wave wideband communications comprises determining the minimum number of directional beams from the base station within millimeter frequency bands above a threshold.

27. The non-transitory computer readable storage medium of claim 25, wherein the stored processor-executable software instructions are configured to cause the processor to perform operations such that determining the minimum number of directional beams from the base station for millimeter wave wideband communications based on the operating conditions of the base station or wireless devices within the coverage area of the base station comprises determining the minimum number of directional beams at a value that balances tradeoffs between improving communication link performance with wireless devices within the coverage area of the base station and operating conditions of the base station.

28. The non-transitory computer readable storage medium of claim 27, wherein the stored processor-executable software instructions are configured to cause the processor to perform operations such that determining the minimum number of directional beams to a value that balances tradeoffs between improving communication link performance and improving operating efficiency of wireless devices within the coverage area of the base station comprises one or more of:

determining the minimum number of directional beams that improves one or more of antenna array gain or link margin with wireless devices within the coverage area of the base station; or setting the minimum number of directional beams to a value that ensures base station equipment remains within operating temperature limits.

29. The non-transitory computer readable storage medium of claim 25, wherein the stored processor-executable software instructions are configured to cause the processor to perform operations such that determining the minimum number of directional beams from the base station for millimeter wave wideband communications based on the operating conditions of the base station or wireless devices within the coverage area of the base station comprises one or more of:

determining the minimum number of directional beams based on a geographical size capturing the coverage area of the base station;

determining the minimum number of directional beams based on a number of wireless devices within the coverage area of the base station;

determining the minimum number of directional beams based on angular coverage of the base station within the coverage area of the base station; or determining the minimum number of directional beams based on total bandwidth demand within the coverage area of the base station.

30. The non-transitory computer readable storage medium of claim 25, wherein the stored processor-executable software instructions are configured to cause the processor to perform operations such that determining the minimum number of directional beams from the base station for millimeter wave wideband communications based on the operating conditions of the base station or wireless devices within the coverage area of the base station comprises determining the minimum number of directional beams based on a number of antenna elements in use by the base station.

* * * * *